United States Patent
Nagamine et al.

(10) Patent No.: US 8,691,415 B2
(45) Date of Patent: Apr. 8, 2014

(54) POWER STORAGE APPARATUS

(75) Inventors: Koichi Nagamine, Toyota (JP);
Masahiro Mito, Okazaki (JP);
Tomotaka Osakabe, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 469 days.

(21) Appl. No.: 12/834,171

(22) Filed: Jul. 12, 2010

(65) Prior Publication Data
US 2011/0111282 A1 May 12, 2011

(30) Foreign Application Priority Data
Nov. 12, 2009 (JP) ................................. 2009-258615

(51) Int. Cl.
*H01M 10/50* (2006.01)
*H01M 6/42* (2006.01)

(52) U.S. Cl.
USPC .......................................... 429/120; 429/157

(58) Field of Classification Search
CPC ..................................................... H01M 10/50
USPC .......... 429/452–471, 120, 149–160, 512–516
See application file for complete search history.

(56) References Cited

U.S. PATENT DOCUMENTS

| | | | | |
|---|---|---|---|---|
| 6,761,992 | B1 * | 7/2004 | Marukawa et al. | 429/96 |
| 2001/0030069 | A1 * | 10/2001 | Misu et al. | 180/68.1 |
| 2006/0115720 | A1 * | 6/2006 | Kim | 429/156 |
| 2011/0262791 | A1 * | 10/2011 | Im et al. | 429/120 |

FOREIGN PATENT DOCUMENTS

JP  2006260967 A  *  9/2006  ............. H01M 2/10

* cited by examiner

*Primary Examiner* — Patrick Ryan
*Assistant Examiner* — Kiran Quraishi
(74) *Attorney, Agent, or Firm* — Finnegan, Henderson, Farabow, Garrett & Dunner, LLP

(57) ABSTRACT

A power storage apparatus includes a plurality of power storage elements aligned in one direction; and a pair of restraint members placed at both ends of the plurality of power storage elements in an alignment direction in which the elements are aligned, the restraint members configured to give a restraint force to the plurality of power storage elements. At least one restraint member of the pair of restraint members includes, a protruding portion protruding toward the power storage element adjacent to the restraint member, an end of the protruding portion being in contact with the adjacent power storage element to form a space between the restraint member and the adjacent power storage element; and a shield portion protruding in the alignment direction and preventing a heat exchange medium for use in temperature adjustment of the power storage element from entering into the space.

6 Claims, 4 Drawing Sheets

POWER STORAGE APPARATUS

TECHNICAL FIELD

The present invention relates to a power storage apparatus which is configured to have a plurality of power storage elements aligned in one direction and has a structure for applying a restraint force to the plurality of power storage elements.

BACKGROUND

In some battery packs including a plurality of cells, a plurality of cells are aligned in one direction and a restraint force is applied to the plurality of cells. Specifically, the application of the restraint force to the plurality of cells is performed by using a pair of restraint members placed at positions to sandwich the plurality of cells. The restraint force refers to a force which shifts adjacent two cells in a direction in which the cells are brought closer to each other.

Of the plurality of cells, the cells located at both ends in the alignment direction, in other words, the cells in contact with the restraint members, tend to have higher heat radiation than the other cells. The temperature of the cells located at both ends decreases easily than that of the other cells. In this case, the temperature may vary among the plurality of cells in the alignment direction.

SUMMARY

It is thus an object of the present invention to provide a power storage apparatus in which an extreme decrease of temperature can be prevented in a power storage element which is in contact with a restraint member.

According to one aspect, the present invention provides a power storage apparatus including a plurality of power storage elements aligned in one direction and a pair of restraint members placed at both ends of the plurality of power storage elements in an alignment direction in which the elements are aligned, the restraint members configured to give a restraint force to the plurality of power storage elements. At least one restraint member of the pair of restraint members includes a protruding portion and a shield portion. The protruding portion protrudes toward the power storage element adjacent to the restraint member, and an end of the protruding portion is in contact with the adjacent power storage element to form a space between the restraint member and the adjacent power storage element. The shield portion protrudes in the alignment direction and prevents a heat exchange medium for use in temperature adjustment of the power storage element from entering into the space.

The shield portion can be provided on each end portion of the restraint member in a direction orthogonal to the alignment direction. The shield portion can also be provided to surround the power storage element adjacent to the restraint member when viewed from the alignment direction.

A supply path and an exhaust path for the heat exchange medium can be provided at positions sandwiching the plurality of power storage elements in a direction orthogonal to the alignment direction. In this case, the shield portion can be placed along the supply path and can be in contact with an outer surface of the power storage element adjacent to the restraint member, the outer surface facing the supply path. This can efficiently prevent the heat exchange medium moving on the supply path from entering into the space formed between the power storage element and the restraint member.

The protruding portion can be formed to have a shape forming sealed space on an outer surface of the power storage element adjacent to the restraint member. Specifically, the protruding portion may be formed to have a shape surrounding a predetermined region when viewed from the alignment direction. Since the sealed space is formed on the outer surface of the power storage element adjacent to the restraint member, the air within the sealed space can be used to suppress a change in temperature of the power storage element. In other words, the sealed space has the function of holding the heat of the power storage element.

The power storage apparatus according to the present invention can be mounted on a vehicle, and the output from the power storage apparatus can be used as energy for use in running of the vehicle. In addition, the power storage apparatus can store regenerative power corresponding to kinetic energy produced in braking of the vehicle.

According to the present invention, the protruding portion of the restraint member can be used to form the space (air layer) between the restraint member and the power storage element, thereby avoiding easy transfer of the heat of the power storage element to the restraint member. Thus, it is possible to suppress an extreme decrease of temperature of the power storage element due to the transfer of the heat of the power storage element to the restraint member.

In addition, since the shield portion can be used to prevent the heat exchange medium from entering into the space formed between the restraint member and the power storage element, it is possible to suppress an extreme decrease of temperature of the power storage element due to the heat exchange between the power storage element and the heat exchange medium, for example.

The extreme temperature decrease in the power storage element in contact with the restraint member can be suppressed in this manner to avoid variations in temperature among the plurality of power storage elements in the alignment direction. This can result in suppression of variations in input/output characteristics (charge/discharge) among the plurality of power storage elements.

DETAILED DESCRIPTION

An embodiment of the present invention will hereinafter be described.

[Embodiment 1]

Figure 1:
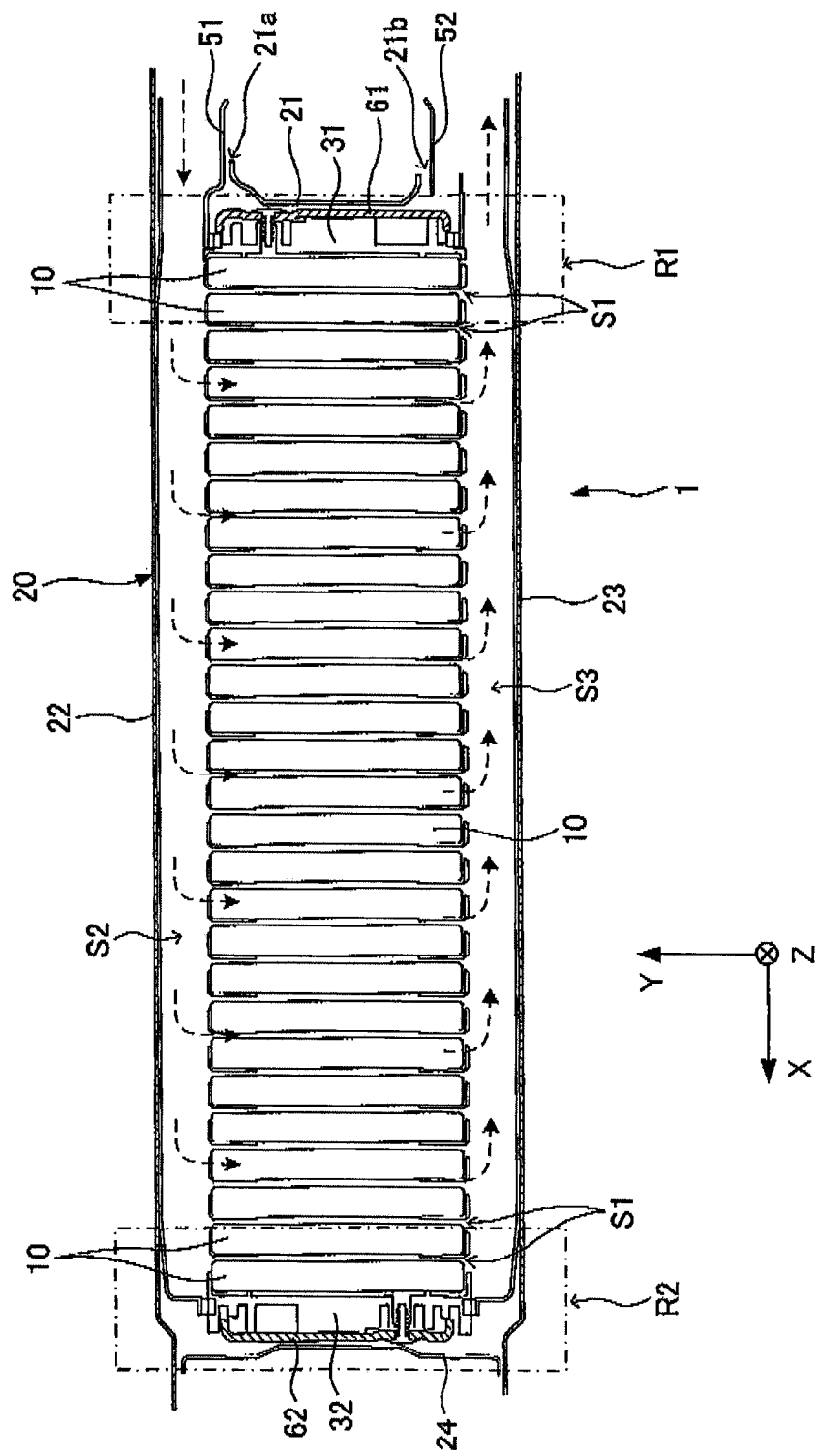
FIG. 1 is a top view showing the internal structure of a battery pack which is Embodiment 1 of the present invention.

A battery pack (corresponding to a power storage apparatus) which is Embodiment 1 of the present invention will hereinafter be described. FIG. 1 is a schematic diagram showing the internal structure of the battery pack of Embodiment 1 and viewed from above. In FIG. 1, an X axis, a Y axis, and a Z axis represent axes orthogonal to each other, and in Embodiment 1, the Z axis is defined as an axis which corresponds to a vertical direction. The same relationship of the X axis, Y axis, and Z axis applies to the other figures.

The battery pack of Embodiment 1 is mounted on a vehicle (not shown) and outputs energy for use in running of the vehicle or stores regenerative power corresponding to kinetic energy produced in braking of the vehicle. For example, a hybrid vehicle or an electric vehicle can be used as the vehicle.

The battery pack 1 has a plurality of cells (corresponding to power storage elements) 10 and a pack case 20 configured to accommodate the plurality of cells 10. The cell 10 is a so-called square-type cell, and for example a secondary battery such as a nickel metal hydride battery or a lithium-ion battery can be used as the cell 10. Alternatively, an electric double layer capacitor (capacitor) can be used instead of the secondary battery.

The plurality of cells 10 are aligned in the X direction and are connected to each other electrically in series through a bus bar (not shown). The cell 10 has a power generation element and a battery case configured to accommodate the power generation element. A positive electrode terminal and a negative electrode terminal are provided on an upper surface of the battery case. In the two adjacent cells in the X direction, the positive electrode terminal of one of those cells 10 is connected electrically to the negative electrode terminal of the other cell 10 through the bus bar.

The power generation element is an element capable of charge and discharge, and for example, can be formed of a positive electrode element, a negative electrode element, and a separator (including an electrolyte solution) placed between the positive electrode element and the negative electrode element. The positive electrode terminal of the cell 10 is connected electrically to the positive electrode element of the power generation element. The negative electrode terminal of the cell 10 is connected electrically to the negative electrode element of the power generation element.

While the plurality of cells 10 are aligned in the X direction in Embodiment 1, the present invention is not limited thereto. For example, a plurality of cells can be used to constitute a single battery module (corresponding to a power storage element) and a plurality of such battery modules can be aligned in the X direction. In this case, the plurality of cells within the battery module are connected to each other electrically in series.

While the plurality of cells 10 are connected to each other electrically in series in Embodiment 1, the present invention is not limited thereto. Specifically, a plurality of cells 10 connected to each other electrically in parallel can be included.

Figure 2:
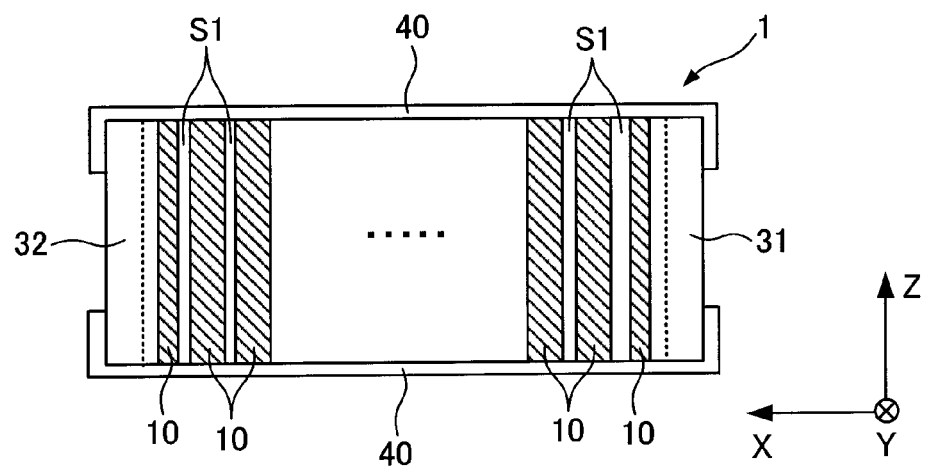
FIG. 2 is a side view showing the internal structure of the battery pack which is Embodiment 1 of the present invention.

A spacer (not shown) is placed between the two adjacent cells 10 in the X direction. The spacer provides a space S1 between the two adjacent cells 10 in the X direction as shown in FIG. 2. As later described, the space S1 serves as the space through which air moves. FIG. 2 is a schematic diagram showing the structure within the pack case 20 when it is viewed from the side direction.

A pair of restraint members 31 and 32 is placed at both ends of the plurality of cells 10 in the X direction. Each of the restraint members 31 and 32 can be made of resin, for example. As shown in FIG. 2, a plurality of bands 40 extending in the X direction are connected to the pair of restraint members 31 and 32. Specifically, two of the bands 40 are aligned in the Y direction on upper surfaces of the plurality of cells 10, and two of the bands 40 are also aligned in the Y direction on lower surfaces of the plurality of cells 10. Each of the bands 40 has one end portion fixed to the one restraint member 31 and the other end portion fixed to the other restraint member 32.

The plurality of bands 40 connected to the pair of restraint members 31 and 32 can shift the pair of restraint members 31 and 32 in a direction in which they are brought closer to each other. Thus, the plurality of cells 10 placed between the pair of restraint members 31 and 32 undergo a restraint force from the pair of restraint members 31 and 32. The restraint force is a force which causes the two adjacent cells 10 in the X direction to be shifted in a direction in which the cells 10 are brought closer to each other.

The application of the restraint force to the cells 10 as in Embodiment 1 can suppress expansion of the cells 10 due to heat generation or the like. The suppression of the expansion of the cells 10 can prevent degradation of input/output characteristics (charge/discharge characteristics) of the cells 10. The positions at which the bands 40 are placed can be set as appropriate. It is essential only that the bands 40 should be able to be used to shift the pair of restraint members 31 and 32 in the direction in which they are brought closer to each other.

An air-intake duct 51 and an exhaust duct 52 are connected to an end face 21 of the pack case 20. The air-intake duct 51 has one end connected to a first connection port 21a of the pack case 20 and the other end provided with an air-intake port (not shown) for taking in air for temperature adjustment. The air-intake port can be provided, for example at a position facing the interior of the vehicle such that the air in the interior of the vehicle can be taken in through the air-intake duct 51. The interior of the vehicle refers to the space of the vehicle in which a passenger rides.

The air-intake duct 51 is provided with a fan (not shown). The fan can be driven to take in the air through the air-intake duct 51.

The exhaust duct 52 has one end connected to a second connection port 21b of the pack case 20 and the other end provided with an exhaust port for exhausting the air directed into the exhaust duct 52 to the outside of the vehicle. The exhaust duct 52 does not need to extend to an outer surface of the vehicle, and the air through the exhaust duct 52 can be exhausted to the outside of the vehicle by using equipment (for example, a tray) within the interior of the vehicle.

While the fan is provided for the air-intake duct 51 in Embodiment 1, the exhaust duct 52 can be provided with the fan. In this case, the fan can also be driven to take in air through the air-intake duct 51.

The air is passed through the air-intake duct 51 and moved into the pack case 20, and then moved along a first sidewall 22 of the pack case 20. A space S2 formed between the first sidewall 22 and the plurality of cells 10 serves as a path (supply path) on which the air before temperature adjustment is moved. As the air is moved through the space S2, it enters into the space S1 formed between the two adjacent cells 10 and flows along the space S1.

After the passage through the space S1, the air is moved to a space S3 formed between the plurality of cells 10 and a second sidewall 23 of the pack case 20. The space S3 serves as a path (exhaust path) on which the air after the temperature adjustment is moved. The air moved to the space S3 is then directed to the exhaust duct 52. Arrows shown by dotted lines in FIG. 1 represent the main movement paths of the air within the pack case 20.

The air is brought into contact with the cells 10 as described in Embodiment 1 to allow the adjustment of the temperature of the cells 10. Specifically, when the cells 10 generate heat due to charge and discharge or the like, a temperature rise in the cells 10 can be suppressed by bringing air for cooling into contact with the cells 10. In contrast, when the cells 10 are cooled extremely, a temperature decrease in the cells 10 can be suppressed by bringing air for heating into contact with the cells 10. The temperature of the cells 10 can be adjusted in this manner to suppress degradation of the input/output characteristics of the cells 10.

While the air is moved from the first sidewall 22 to the second sidewall 23 of the pack case 20 as shown in FIG. 1 in Embodiment 1, the present invention is not limited thereto. For example, the air can be moved from an upper surface to a lower surface of the pack case 20, or the air can be moved from the lower surface to the upper surface of the pack case 20. It is necessary only that the air for temperature adjustment should be able to be introduced into the space S1 formed between the two adjacent cells 10 in the X direction and then exhausted therefrom. The connection positions of the air-intake duct 51 and the exhaust duct 52 to the pack case 20 can be set as appropriate in view of the path on which the air is moved within the pack case 20.

While the air-intake duct 51 and the exhaust duct 52 are connected to the one end face 21 of the pack case 20 in Embodiment 1, the present invention is not limited thereto. Specifically, it is essential only that the outside air (air before heat exchange) should be able to be supplied to the pack case 20 and the air within the pack case 20 (air after the temperature adjustment) can be exhausted to the outside.

For example, the air-intake duct 51 and the exhaust duct 52 can be connected to two end faces 21 and 24 of the pack case 20, respectively. The end faces 21 and 24 constitute the surfaces (Y-Z plane) orthogonal to the alignment direction (X direction) of the plurality of cells 10. The connection ports of the air-intake duct 51 and the exhaust duct 52 to the pack case 20 are preferably provided at different positions when viewed from the alignment direction (X direction) of the cells 10. This allows the air for temperature adjustment to be moved smoothly within the pack case 20.

While the air is supplied into the pack case 20 in Embodiment 1, another gas or a liquid can be used. Specifically, it is necessary only to use something (heat exchange medium) which enables the temperature adjustment of the cells 10 through heat exchange with the cells 10. When a liquid is used, it is preferable that a liquid having insulation is used.

Next, the structure of the restraint members 31 and 32 in Embodiment 1 will hereinafter be described with reference to FIGS. 3 to 6.

Figure 4:
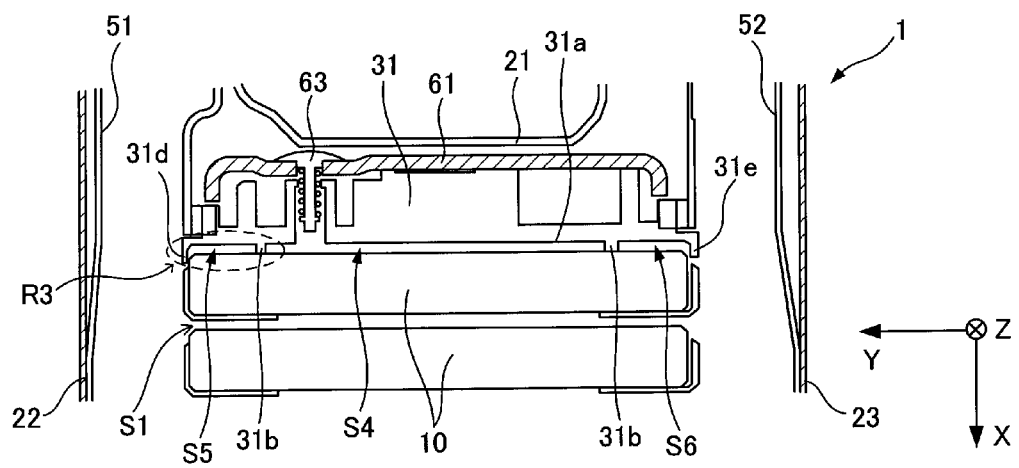
FIG. 4 is an enlarged view showing a region R1 in FIG. 1.
Figure 5:
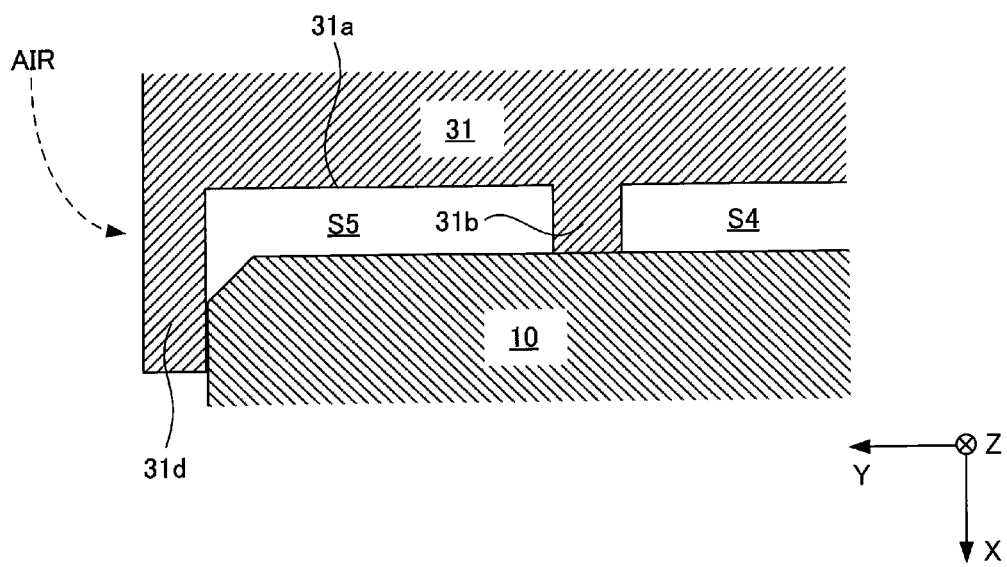
FIG. 5 is an enlarged view showing a region R3 in FIG. 4.

As shown in FIGS. 1 and 4, a metal plate 61 for ensuring the strength of the restraint member 31 is fixed to an outer surface of the restraint member 31 with a bolt 63. The metal plate 61 is placed between the end face 21 of the pack case 20 and the restraint member 31. FIG. 4 is an enlarged view showing a region R1 indicated by alternate long and short dashed lines in FIG. 1.

Figure 6:
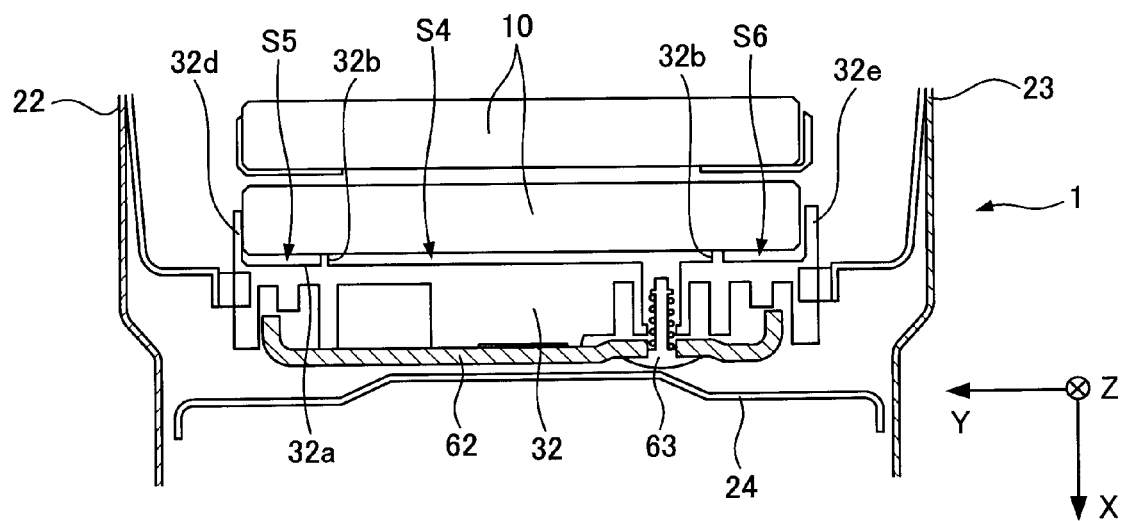
FIG. 6 is an enlarged view showing a region R2 in FIG. 1.

As shown in FIGS. 1 and 6, a metal plate 62 for ensuring the strength of the restraint member 32 is fixed to an outer surface of the restraint member 32 with a bolt 63. The metal plate 62 is placed between the end face 24 of the pack case 20 and the restraint member 32. FIG. 6 is an enlarged view showing a region R2 indicated by alternate long and short dashed lines in FIG. 1. The metal plates 61 and 62 can be omitted.

Figure 3:
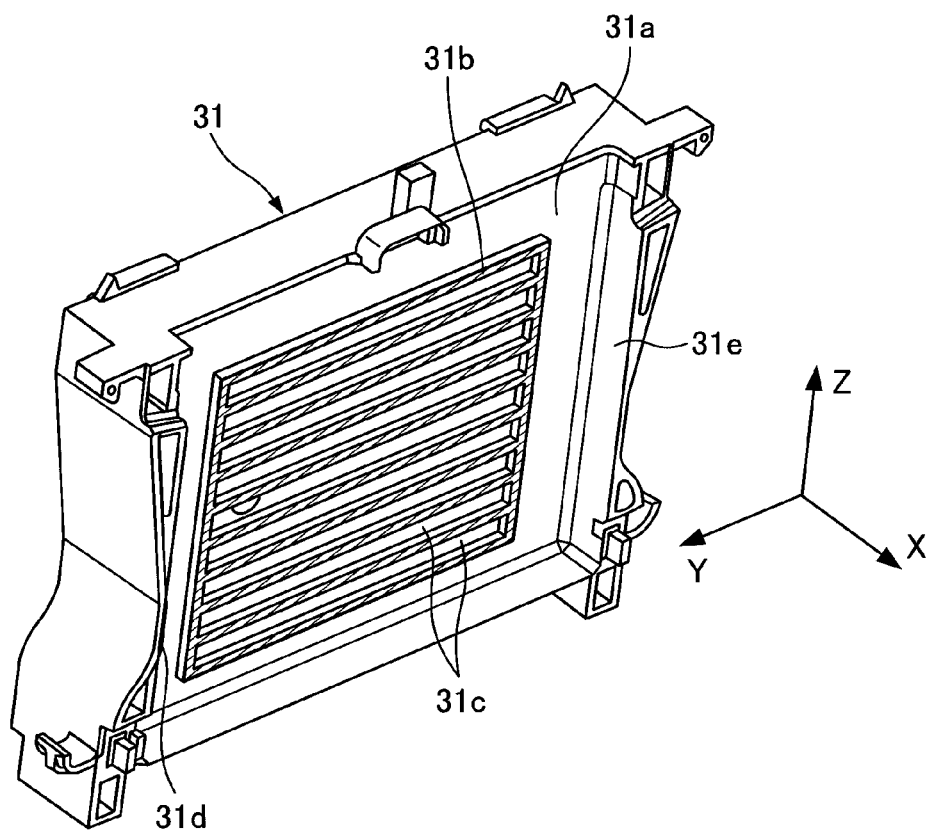
FIG. 3 is a diagram showing the outer appearance of a restraint member in Embodiment 1.

As shown in FIG. 3, the restraint member 31 has a restraint portion (corresponding to a protruding portion) 31b formed to protrude on an inner surface 31a facing the cells 10. End faces of the restraint portion 31b are in contact with the side face (Y-Z plane) of the cell 10. Since the restraint portion 31b is formed, a plurality of recessed portions 31c aligned in the Z direction are provided in the inner surface 31a of the restraint portion 31. Each of the recessed portions 31c extends in the Y direction. The size of the restraint portion 31b is set such that the restraint portion 31b fits inside an outer edge of the cells 10 when viewed from the X direction.

When the restraint portion 31b is brought into contact with the side face (Y-Z plane) of the cell 10, a space S4 (see FIG. 4) associated with the recessed portion 31c is hermetically sealed generally. Specifically, a flow of air into and out of the space S4 is almost blocked, and the air layer within the space S4 can be used to hold the heat of the cell 10. Since the space S4 is formed by bringing the restraint portion 31b into contact with the cell 10, completely sealed space is not formed.

While the restraint portion 31b is formed to have the shape shown in FIG. 3 in Embodiment 1, the present invention is not limited thereto. It is essential only that the restraint portion 31b should be able to be used to form the sealed space (space S4) between the restraint member 31 and the cell 10, and based on this point, the shape of the restraint portion 31b can be set as appropriate. Specifically, it is necessary only that a predetermined region on the inner surface 31a should be surrounded by the restraint portion 31b when viewed from the X direction.

The restraint member 31 has a pair of shield portions 31d and 31e at both end portions in the Y direction and the shield portions 31d and 31e protrude in the X direction. One of them, the shield portion 31d, is in contact with the side face (X-Z plane) of the cell 10 that is opposed to the first sidewall 22. The other, the shield portion 31e, is placed along the side face (X-Z plane) of the cell 10 that is opposed to the second sidewall 23 and is separate from the side face (X-Z plane) of the cell 10. The shield portion 31e can be in contact with the side face (X-Z plane) of the cell 10.

Since the restraint portion 31b is in contact with the side face (Y-Z plane) of the cell 10, the spaces S4 to S6 are formed between the cell 10 and the restraint member 31 as shown in FIG. 4. The shield portion 31d prevents the air moving along the first sidewall 22 from entering into the space (mainly the space S5) formed between the cell 10 and the restraint member 31. The shield portion 31e prevents the air moving along the second sidewall 23 from entering into the space (mainly the space S6) formed between the cell 10 and the restraint member 31.

Since the shield portions 31d and 31e are used, the circulating air for temperature adjustment can be prevented from coming into contact with the side face (Y-Z plane) of the cell 10 that is opposed to the restraint member 31. This can preclude the cell 10 placed alongside of the restraint member 31 in the X direction from being cooled extremely by the air for temperature adjustment. Thus, variations in temperature can be avoided between that cell and the other adjacent cells 10 in the X direction.

On the other hand, the restraint member 32 has the same structure as that of the abovementioned restraint member 31. Specifically, as shown in FIG. 6, the restraint member 32 has a restraint portion 32b provided on an inner surface 32a opposed to the cell 10 and shield portions 32d and 32e. The restraint portion 32b has the same structure as that of the abovementioned restraint portion 31b. The shield portions 32d and 32e have the same structures as those of the abovementioned shield portions 31d and 31e. The spaces S4 to S6 are formed between the cell 10 and the restraint member 32.

According to the present invention, in the configuration in which the plurality of cells 10 are aligned in one direction, the supply of the air for temperature adjustment to the cells placed at both ends in the alignment direction can be limited to prevent an extreme decrease of temperature of the cells 10. It is thus possible to avoid variations in temperature among the cells in the X direction. This can result in suppression of variations in input/output characteristics among the cells 10 to achieve the efficient use of the plurality of cells 10.

If the restraint member 31b is omitted and the inner surface 31a of the restraint member 31 is brought into contact with the side face (Y-Z) of the cell 10, it is possible to prevent the air for temperature adjustment from entering between the restraint member 31 and the cell 10. This configuration, however, increases the area of contact between the cell 10 and the restraint member 31, so that the heat of the cell 10 is easily escaped to the restraint member 31. Since the air has a lower thermal conductivity than that of the restraint member 31, the restraint member 31 is preferably separate from the cell 10 rather than in contact with the cell 10.

While the shield portions 31d and 31e are provided on both end portions of the restraint member 31 in the Y direction in Embodiment 1, the present invention is not limited thereto. For example, the shield portion 31e can be omitted and only the shield portion 31d can be provided. In this case, it is also possible to prevent the air taken in through the air-intake duct 51 from entering into the space formed between the cell 10 and the restraint member 31.

If the movement path of air is changed within the pack case 20, portions corresponding to the shield portions 31d and 31e can be provided at positions associated with the movement path of the air. For example, in a configuration in which air is moved from above to below the cells 10, portions corresponding to the shield portions 31d and 31e can be provided on an upper portion and a lower portion of the restraint member 31.

The shield portions can be provided to surround the entire outer edge of the cell 10 when viewed from the X direction. Such a configuration can prevent the entry of air from all directions within the Y-Z plane into the spaces S4 to S6 formed between the cell 10 and the restraint member 31.

While the shield portion 31d is in contact with the side face (X-Z plane) of the cell 10 that is opposed to the first sidewall 22 as shown in FIG. 4 in Embodiment 1, the present invention is not limited thereto. Specifically, the end face of the shield portion 31d can be brought into contact with the side face (Y-Z plane) of the cell 10 that is opposed to the restraint member 31. The shield portion 31e can be configured in the same manner. Such a configuration can also prevent the air from entering into the space formed between the cell 10 and the restraint member 31.

The shield portion 31d can be extended in the X direction to prevent the entry of air not only into the space formed between the cell 10 and the restraint member 31 but also into the space formed between the two adjacent cells 10.

While the restraint portion 31b and the shield portions 31d and 31e are provided for the restraint member 31 in Embodiment 1, the present invention is not limited thereto. Specifically, only one of the restraint portion 31b and the shield portions 31d and 31e can be provided.

In the configuration in which only the restraint portion 31b is provided, the air for temperature adjustment does not enter into the space S4 associated with the recessed portion 31c, and the air layer within the space S4 can be used to hold the heat of the cell 10. In the configuration, a portion (the portion extending in the Z direction in FIG. 3) of the restraint portion 31b corresponds to the shield portion cited in the present invention. The other portion (the portion extending in the Y direction in FIG. 3) of the restraint portion 31b corresponds to the protruding portion cited in the present invention.

In the configuration in which only the shield portions 31d and 31e are provided, it is possible to prevent the air for temperature adjustment from entering in the Y direction into the space formed between the cell 10 and the restraint member 31. To form the space between the cell 10 and the restraint member 31, a protruding portion needs to be provided on the restraint member 31, for example. The protruding portion has the function of forming space between the cell 10 and the restraint member 31 similarly to the restraint member 31b described in Embodiment 1, but does not have the function of forming sealed space as in the restraint portion 31b. Specifically, it is essential only that such protruding portions extending in the Y direction should be aligned at predetermined intervals in the Z direction.

In the configuration in which only the shield portions 31d and 31e are used, the air can easily stay in the space formed between the cell 10 and the restraint member 31 to hold the heat of the cell 10.

What is claimed is:

1. A power storage apparatus comprising:
    a plurality of power storage elements aligned in one direction;
    a supply path configured to supply a heat exchange medium to the power storage elements, and extending in an alignment direction in which the power storage elements are aligned, wherein the power storage elements are sandwiched with respect to positions, the sandwiching is in a direction orthogonal to the alignment direction, and the supply path is arranged at one of the positions, the heat exchange medium being configured to be used to adjust a temperature of the power storage element; and
    a pair of restraint members placed at both ends of the plurality of power storage elements in the alignment direction, the restraint members being configured to give a restraint force to the plurality of power storage elements,
    wherein at least one restraint member of the pair of restraint members includes:
        a protruding portion protruding toward the power storage element adjacent to the restraint member, an end of the protruding portion being in contact with the adjacent power storage element to form a space between the restraint member and the adjacent power storage element; and
        a shield portion protruding in the alignment direction and being arranged between the supply path and the space to prevent the heat exchange medium from entering into the space.

2. The power storage apparatus according to claim 1, wherein the shield portion is provided on each end portion of the restraint member in a direction orthogonal to the alignment direction.

3. The power storage apparatus according to claim 1, wherein the shield portion is provided at a position surrounding the power storage element adjacent to the restraint member when viewed from the alignment direction.

4. The power storage apparatus according to claim 1, further comprising an exhaust path for the heat exchange medium,
    wherein the supply path and the exhaust path are each arranged at one of the positions sandwiching the plurality of power storage elements in the direction orthogonal to the alignment direction,
    wherein the shield portion is placed along the supply path and is in contact with an outer surface of the power storage element adjacent to the restraint member, the outer surface facing the supply path.

5. The power storage apparatus according to claim 1, wherein the protruding portion is formed to have a shape forming sealed space on an outer surface of the power storage element adjacent to the restraint member.

6. The power storage apparatus according to claim 1, wherein the power storage apparatus is mounted on a vehicle and outputs energy for use in running of the vehicle.

\* \* \* \* \*